US009537158B2

(12) United States Patent
Kim et al.

(10) Patent No.: US 9,537,158 B2
(45) Date of Patent: Jan. 3, 2017

(54) OXIDATION RESISTANT FERRITIC STAINLESS STEEL INCLUDING COPPER-CONTAINING SPINEL-STRUCTURED OXIDE, METHOD OF MANUFACTURING THE STEEL, AND FUEL CELL INTERCONNECT USING THE STEEL

(71) Applicant: KOREA INSTITUTE OF SCIENCE AND TECHNOLOGY, Seoul (KR)

(72) Inventors: Dong-Ik Kim, Seoul (KR); Byung Kyu Kim, Seoul (KR); Ju Heon Kim, Seoul (KR); Young-Su Lee, Seoul (KR); In Suk Choi, Seoul (KR); Jin-Yoo Suh, Seoul (KR); Jae-Hyeok Shim, Seoul (KR); Woo Sang Jung, Seoul (KR); Young Whan Cho, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 414 days.

(21) Appl. No.: 13/686,124

(22) Filed: Nov. 27, 2012

(65) Prior Publication Data

US 2013/0143141 A1    Jun. 6, 2013

(30) Foreign Application Priority Data

Nov. 30, 2011  (KR) ......................... 10-2011-0127021
Oct. 24, 2012  (KR) ......................... 10-2012-0118679

(51) Int. Cl.
| | | |
|---|---|---|
| H01M 8/02 | (2016.01) | |
| C21D 9/00 | (2006.01) | |
| C22C 38/16 | (2006.01) | |
| C22C 38/18 | (2006.01) | |
| C22C 38/20 | (2006.01) | |
| B23K 35/30 | (2006.01) | |
| C22C 9/00 | (2006.01) | |

(52) U.S. Cl.
CPC ............ *H01M 8/021* (2013.01); *B23K 35/302* (2013.01); *C21D 9/0068* (2013.01); *C22C 9/00* (2013.01); *Y02E 60/50* (2013.01); *Y02P 70/56* (2015.11)

(58) Field of Classification Search
CPC ........ H01M 8/021; C21D 9/0068; C22C 9/00; B23K 35/302
USPC ........ 429/468, 509, 519, 522; 148/325, 605; 420/34, 60, 89, 90, 93
See application file for complete search history.

(56) References Cited

U.S. PATENT DOCUMENTS

| | | | | |
|---|---|---|---|---|
| 2009/0035561 | A1* | 2/2009 | Gopalan | C25D 5/34 |
| | | | | 428/336 |
| 2009/0104494 | A1* | 4/2009 | Quadakkers et al. | 429/27 |
| 2010/0132842 | A1* | 6/2010 | Lee et al. | 148/222 |
| 2011/0111327 | A1* | 5/2011 | Ohmori et al. | 429/520 |

(Continued)

FOREIGN PATENT DOCUMENTS

| | | | | |
|---|---|---|---|---|
| DE | EP 2460904 | A2 * | 6/2012 | ........... C22C 38/005 |
| JP | 3-712733 | B2 | 8/2005 | |

(Continued)

OTHER PUBLICATIONS

Naumann et al., Machine translation of EP 2460904 A2, Jun. 2012.*

(Continued)

*Primary Examiner* — Sean P Cullen
(74) *Attorney, Agent, or Firm* — Ladas & Parry LLP

(57) ABSTRACT

An oxidation-resistant ferritic stainless steel including a ferritic stainless steel base material, and a Cu-containing spinel-structured oxide.

11 Claims, 12 Drawing Sheets

(56) References Cited

U.S. PATENT DOCUMENTS

| | | | | |
|---|---|---|---|---|
| 2011/0250522 A1* | 10/2011 | Kaminaka | ............... | C22C 38/40 |
| | | | | 429/479 |
| 2012/0177530 A1* | 7/2012 | Yasuda | ................ | C22C 38/005 |
| | | | | 420/40 |
| 2013/0230792 A1* | 9/2013 | Wilson et al. | ................ | 429/509 |

FOREIGN PATENT DOCUMENTS

| | | | |
|---|---|---|---|
| JP | 2010-202490 A | 9/2010 | |
| JP | WO 2011034002 A1 * | 3/2011 | ........... C22C 38/005 |
| JP | 2011-099159 A | 5/2011 | |
| KR | 1020050093421 A | 9/2005 | |
| KR | 1020060096989 A | 9/2006 | |
| KR | 1020080097459 A | 11/2008 | |
| KR | 1020100120401 A | 11/2010 | |
| KR | 1020110094048 A | 8/2011 | |
| WO | 2005/024098 A2 | 3/2005 | |
| WO | 2010/071068 A1 | 6/2010 | |

OTHER PUBLICATIONS

Uehara et al., Long-Term Oxidation Behavior of Fe—Cr Ferritic Alloy ZMG232L for SOFC Interconnects, 2009, ECS Transactions, 25, 1455-1462.*

Korea Non-Final Rejection Dated Apr. 29, 2014 Appln. No. 10-2012-0118879.

Korean Notice of Allowance Appln. No. 10-2012-0118679; Dated Nov. 18, 2014.

* cited by examiner

OXIDATION RESISTANT FERRITIC STAINLESS STEEL INCLUDING COPPER-CONTAINING SPINEL-STRUCTURED OXIDE, METHOD OF MANUFACTURING THE STEEL, AND FUEL CELL INTERCONNECT USING THE STEEL

CROSS-REFERENCE TO RELATED PATENT APPLICATION

This application claims the benefit of Korean Patent Application Nos. 10-2011-0127021, filed on Nov. 30, 2011, and 10-2012-0118679, filed on Oct. 24, 2012, in the Korean Intellectual Property Office, the disclosure of which is incorporated herein in its entirety by reference.

BACKGROUND OF THE INVENTION

1. Field of the Invention

The present invention relates to an oxidation-resistant ferritic stainless steel, a method of manufacturing the steel, and a fuel cell interconnector using the steel, and more particularly, to an oxidation-resistant ferritic stainless steel having a Cu-containing spinel-structured oxide formed on a base material, a method of manufacturing the steel, and a fuel cell connector using the steel.

2. Description of the Related Art

Ferritic stainless steels, which generally contain 11% by weight or more of Cr, are cheaper than austenitic stainless steels and stress corrosion cracking due to chlorides does not occur in ferritic stainless steels. Due to these characteristics, demands for ferritic stainless steels have been gradually increased.

A ferritic stainless steel used in a high temperature environment, for example, as a material for boilers and pipes of power plants, exhaust pipes of vehicles, or fuel cell interconnectors, is required to have high thermal resistance and excellent oxidation resistance.

Particularly, when a ferritic stainless steel is used for a fuel cell interconnector, the ferritic stainless steel serves as a separator that separates fuel supplied for a fuel cell from air and serves as a connector between unit cells, thus characteristics such as a high electrical conductivity, an excellent oxidation resistance at an operation temperature, a coefficient of thermal expansion similar to other parts of the fuel cell, and a low cost are required. Conventionally, ceramic materials such as graphite, $Cr-5Fe-1Y_2O_3$-doped $LaCrO_3$, or the like, which have excellent stability at a high temperature, were used as materials for a fuel cell interconnector. However, metallic materials are mainly considered due to processability problems. In a case of SOFC, a Ni-based superalloy such as inconel has been often used, but since commercial use of SOFC is difficult because of its high price, active studies have recently been done on use of a ferritic stainless steel.

In a conventional art, oxidation resistance of ferritic stainless steels has been improved by reducing the content of impurities such as C, N, and O and adding alloy elements forming a stable oxide layer such as Cr, Ni, Co, Zr, and rare earth metals.

In KR 2006-0096989, a method for making a ferritic stainless steel article having an oxidation resistant surface includes providing a ferritic stainless steel comprising aluminum, at least one rare earth metal and 16 to less than 30 wt % chromium (here, the total weight of rare earth metals is greater than 0.02 wt %). At least one surface of the ferritic stainless steel is modified so that, when subjected to an oxidizing atmosphere at high temperature, the modified surface develops an electrically conductive, aluminum-rich, oxidation resistant oxide scale comprising chromium and iron and a having a hematite structure differing from $Fe_2O_3$, alpha $Cr_2O_3$ and alpha $Al_2O_3$ to increase high thermal resistance of a ferritic stainless steel is disclosed.

In KR 2005-0093421, a separator for a fuel cell that comprises a metal substrate that contains at least one metal element M and a surface layer formed on a surface of the metal substrate and that contains at least one conductive oxide represented by $LaM_xO_3$ (wherein x=0 to 1) to provide a separator for a fuel cell that has an excellent electrical conductivity and significantly improved anti-corrosiveness is disclosed.

In KR 2010-0120401, a interconnector for a solid oxide fuel cell including a substrate formed of a ferritic stainless steel, a first coating layer including at least one of Ni and Cu, wherein the first coating layer is formed on the substrate, and a second coating layer including a rare earth metal, wherein the second coating layer is formed on the first coating layer to provide a interconnector for a solid oxide fuel cell that may form an oxide with an excellent conductivity on a surface of the substrate in an oxidation atmosphere at a high temperature is disclosed.

In KR 2011-0094048, a separator material for a fuel cell including a Au—a first composition alloy layer or a Au layer, wherein the first composition is formed of at least one metal selected from the group consisting of Al, Cr, Co, Ni, Cu, Mo, Sn, and Bi; and a middle layer between the alloy layer or the Au layer and the stainless steel layer, wherein the middle layer is consisted of 20 wt % or more of the first composition and 20 to 50 wt % of oxygen. The alloy layer or the Au layer has an area with a thickness of 1 nm or greater from the outermost surface to a lower layer that contains 40 wt % of Au, or an area with a thickness of 3 nm or greater from the outermost surface to a lower layer that contains 10 to 40 wt % of Au, wherein the Au layer has a thickness of 1 nm or greater.

However, although oxidation-resistance of a ferritic stainless steel may be increased since the prior arts stated above adds Mo, Al, and rare earth metals, or applies a coating layer or an alloy layer on a substrate, intensity of the ferritic stainless steel may be weakened or processability may be deteriorated, and manufacturing costs of the ferritic stainless steel may increase due to the addition of oxidation resistant elements.

Meanwhile, when a stainless steel with a high content of Cr is used as an interconnector for a fuel cell, Cr sticks to a cathode of the fuel cell as Cr is volatilized while operating the fuel cell, and thus performance of the fuel cell is degraded. Conventionally this problem has been solved by using a coating method or the like, but the coating method may not be appropriate due to a feature of an interconnector that may result a complicate shape in a flow channel design procedure.

SUMMARY OF THE INVENTION

The present invention provides an oxidation-resistant ferritic stainless steel having an excellent oxidation resistance and an improved electrical conductivity, a method of manufacturing the steel, and a fuel cell interconnector using the steel.

According to an aspect of the present invention, there is provided an oxidation-resistant ferritic stainless steel including a ferritic stainless steel base material including Fe, Cr, Mn, and Cu, and a spinel-structured oxide containing Cu and at least one of Mn and Cr.

An amount of Cu contained in the ferritic stainless steel base material may be about 1.5 wt % to about 7.5 wt %.

The ferritic stainless steel base material may further include Al, Ti, C, and N.

The ferritic stainless steel base material may include about 10 to about 30 wt % of Cr, about 0.3 wt % or less of Al, about 0.1 to about 2.0 wt % of Mn, about 0.02 to about 0.5 wt % of Ti, about 0.2 wt % or less of C, about 0.1 wt % or less of N, about 0.01 to about 0.5 wt % of La, about 1.5 to about 7.5 wt % of Cu, and the rest of Fe.

The Cu-containing spinel-structured oxide may include at least one of an oxide represented by $(Cu, Cr)_3O_4$ and an oxide represented by $(Cu, Mn)_3O_4$.

The Cu-containing spinel-structured oxide may include at least one of an oxide represented by $CuCr_2O_4$ and an oxide represented by $Cu_{1.3}Mn_{1.7}O_4$.

The Cu-containing spinel-structured oxide may include an oxide represented by $CuCr_2O_4$.

According to another aspect of the present invention, there is provided a method of manufacturing an oxidation-resistance ferritic stainless steel, the method including providing a ferritic stainless steel base material including Fe, Cr, Mn, and Cu and forming a spinel-structured oxide that contains Cu and at least one of Mn and Cr in the ferritic stainless steel base material by heat-treatment of the base material at a temperature in a range of about 600° C. to about 800° C.

The heat-treatment may be performed for about 10 minutes to about 500 hours.

According to another aspect of the present invention, there is provided a fuel cell interconnector including the oxidation-resistant ferritic stainless steel described above.

According to another aspect of the present invention, there is provided a fuel cell including unit cells each comprising an anode, an electrolyte, and a cathode, and the fuel cell interconnector described above connecting the unit cells.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
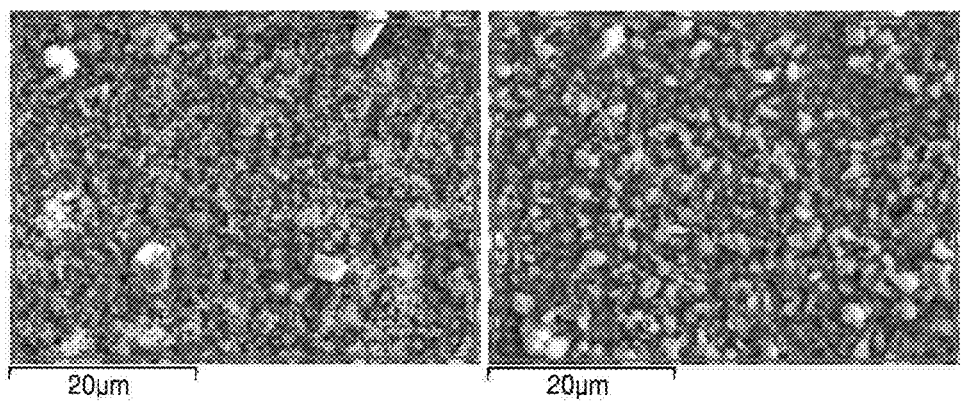
FIG. 1 is scanning electron microscope (SEM) images of oxides formed on a surface of an oxidation-resistant ferritic stainless steel of Example 1 and a surface of a ferritic stainless steel of Comparative Example 1.

Expressions such as "at least one of," when preceding a list of elements, modify the entire list of elements and do not modify the individual elements of the list.

An oxidation-resistant ferritic stainless steel according to an embodiment of the present invention includes a ferritic stainless steel base material including Fe, Cr, Mn, and Cu; and a spinel-structured oxide containing Cu and at least one of Mn and Cr.

Cu has excellent electrical conductivity, and thus electrical conductivity of a ferric stainless steel including Cu may be increased. Cu is present in the base material as a solid solution or a precipitate, and thus strength of the base material may be increased. Also, the spinel-structured oxide containing Cu has electrical conductivity that is about 20 to about 10,000 times higher than a Mn- and/or Cr-based oxide, which does not include Cu, and thus electrical conductivity of the oxidation-resistant ferritic stainless steel including the Cu-containing spinel-structured oxide may be significantly improved. Also, the Cu-containing spinel-structured oxide has a coefficient of thermal expansion (about $11 \times 10^{-6}$ to about $13 \times 10^{-6}$/° C.) that is similar to the that of ceramic materials used in a fuel cell, and thus when the oxidation-resistant ferritic stainless steel including the Cu-containing spinel-structured oxide is used as an interconnector for a fuel cell, volume expansion of the fuel cell at a high temperature may be the same as that of a fuel cell including other ceramic material. Moreover, when the fuel cell is operated, cell performance degradation of the fuel cell may be prevented as the Cr volatility is reduced.

The ferritic stainless steel base material may include about 1.5 wt % to about 7.5 wt % of Cu. When the content of Cu is within the range above, the Cu-containing spinel-structured oxide may be effectively produced, and a ferritic stainless steel with excellent electric conductivity, strength, and oxidation resistance may be obtained. For example, when the content of Cu is within the range above, destruction due to liquid phase presented by an excessive amount of Cu content during hot-rolling may be prevented, or excessive precipitation of Cu phase during recrystallization heat-treatment may be prevented.

For example, the content of Cu in the ferritic stainless steel base material may be in a range of about 1.5 wt % to about 3.4 wt %. If the content of Cu is within the range above, fine sized Cu precipitates can be formed in the ferritic stainless steel base material, and thus strengthening effect of the base material due to addition of Cu may be enhanced.

The ferritic stainless steel base material may further include Al, Ti, C, and N.

For example, the ferritic stainless steel base material may further include about 10 to about 30 wt % of Cr; about 0.3 wt % or less of Al; about 0.1 to about 2.0 wt % of Mn; about 0.02 to about 0.5 wt % of Ti; about 0.2 wt % or less of C; about 0.1 wt % or less of N; about 0.01 to about 0.5 wt % of La; about 1.5 to about 7.5 wt % of Cu; and the rest of Fe, but is not limited thereto.

Cr is an element that is essential in obtaining corrosion resistance, and the ferritic stainless steel includes 10 to 30 wt % of Cr. If the content of Cr is within this range, the ferritic stainless steel may have desirable corrosion resistance, processability, and manufacturability. The ferritic stainless steel may include about 0.005 to about 0.3 wt % of Al as a deoxidizing element. If the content of Al is within this range, processability and toughness of the ferritic stainless steel may be desirable. The ferritic stainless steel may include about 0.02 to about 0.5 wt % of Mn as a solid solution hardening element. If the content of Mn is within this range, processability of the ferritic stainless steel may be desirable. The ferritic stainless steel may include about 0.02 to about 0.5 wt % of Ti, which fixes C or N, to improve softening and ductility rate of the ferritic stainless steel. If the content of Ti is within this range, ductility and processability of the ferritic stainless steel may be desirable. The ferritic stainless steel may include about 0.002 to about 0.2 wt % of C. If the content of C is within this range, rust resistance of the ferritic stainless steel may be desirable. The ferritic stainless steel may include about 0.001 to about 0.1 wt % of N. If the content of N is within this range, processability of the ferritic stainless steel may be desirable. The ferritic stainless steel may include about 0.01 to about 0.5 wt % of La as a lanthanoid rare earth element for improving oxidation resistance. If the content of La is too much, processability of the ferritic stainless steel may be degraded.

The spinel-structured oxide included in the oxidation-resistant ferritic stainless steel according to an embodiment of the present invention may be present on a surface of the ferritic stainless steel base material or in the ferritic stainless steel base material.

The spinel-structured oxide may include at least one of an oxide represented by $(Cu, Cr)_3O_4$ and an oxide represented by $(Cu, Mn)_3O_4$. For example, the spinel-structured oxide may include at least one of an oxide represented by $CuCr_2O_4$ and an oxide represented by $Cu_{1.3}Mn_{1.7}O_4$. Alternatively, the spinel-structured oxide may include an oxide represented by $CuCr_2O_4$.

A method of manufacturing the oxidation-resistant ferritic stainless steel according to an embodiment of the present invention includes providing the ferritic stainless steel base material including Fe, Cr, Mn, and Cu; and heat treatment the base material at a temperature in a range of about 600° C. to about 800° C. to form an spinel-structured oxide containing Cu and at least one of Mn and Cr The providing of the ferritic stainless steel base material including Cu may be performed by a known method including vacuum induction melting of a metal mixture of Fe, Cr, Mn, Cu and optionally at least one of Al, Ti, C, N, and La, homogenization heat treatment, forging, hot-rolling, cool-rolling, and heat treatment (recrystallization). The heat treatment for recrystallization may be performed for about 5 minutes to about 1 hour.

During the heat treatment that produces the oxide with the spinel structure, Cu presented as a solid solution or a precipitate in the oxidation-resistant ferritic stainless steel may form an oxide represented by $(Cu, Cr)_3O_4$ or an oxide represented by $(Cu, Mn)_3O_4$ having a coefficient of thermal expansion that is similar to that of the base material. For example, the oxidation-resistant ferritic stainless steel may form at least one of an oxide represented by $CuCr_2O_4$ and an oxide represented by $Cu_{1.3}Mn_{1.7}O_4$. High-temperature strength or fatigue strength of the oxidation-resistant ferritic stainless steel may be improved due to the Cu presented as a solid solution or a precipitate.

For example, the heat-treatment may be performed for about 10 minutes to about 500 hours, or, for example, about 1 hour to about 100 hours. If time for the heat-treatment is within the range above, the Cu-containing spinel-structured oxide may be formed at a desirable level.

A fuel cell interconnector according to an embodiment of the present invention includes the oxidation-resistant ferritic stainless steel described above.

The fuel cell interconnector including the oxidation-resistant ferritic stainless steel includes Cu, which has a solid solution hardening effect or a precipitate hardening effect at a temperature in a range of about 600° C. to about 800° C., which is a fuel cell operating temperature range. Thus, the fuel cell interconnector may have excellent high-temperature strength or fatigue strength at a temperature in a range of about 600° C. to about 800° C. Also, due to presence of the Cu-containing spinel oxide, the fuel cell interconnector has an increased oxidation resistance and improved electrical conductivity.

Also, when a fuel cell interconnector including an oxidation-resistant ferritic stainless steel including a Cu-containing spinel oxide is used, Cr volatility is reduced, and thus Cr is deposited on a cathode as the fuel cell is operated, then cell performance degradation may be suppressed. Although not limited by a theory, when a composite oxide including Cu is formed, activity of each element may be reduced, and a vapor pressure of $CrO_3$, as a gas phase of Cr is reduced, thus volatility of Cr is reduced.

When the oxidation-resistant ferritic stainless steel including the Cu-containing spinel oxide according to an embodiment of the present invention is used as a fuel cell interconnector, only the ferritic stainless steel base material may be installed in the fuel cell to form a composite oxide including Cu during the fuel cell operation, and thus the steel may serve as a desired fuel cell interconnector. Alternatively, when the ferritic stainless steel base material is preoxidated and installed in the fuel cell as a composite oxide that includes Cu formed on the ferritic stainless steel base material, an additional composite oxide including Cu is formed during the fuel cell operation, and thus the steel may serve as the fuel cell interconnector.

Hereinafter, an oxidation-resistant ferritic stainless steel according to one or more embodiments of the present invention will be described in detail with reference to the following examples. These examples are not intended to limit the purpose and scope of the one or more embodiments of the present invention.

Examples

Example 1

A ferritic stainless steel base material having a composition of Fe-23Cr-0.02Al-0.4Mn-0.05Ti-0.01C-0.007N-0.1La-1.8Cu was prepared.

4459.76 g of Fe, 1350.80 g of Cr, 1.12 g of Al, 24.77 g of Mn, 4.38 g of Ti, 0.6 g of C, 64.52 g of Fe-7.75N-60Cr-alloy, 5.85 g of La, and 108.54 g of Cu were mixed to prepare a metal mixture with a total mass of 6 kg. The mixture was vacuum induction melted using ULVAC FMI-1-158 vacuum induction melting furnace, homogenized at 1150° C. for 24 hours by heat-treatment, and forged at 1150° C. to a thickness of 37 mm. Subsequently, the resultant was hot-rolled at 1050° C. (50% hot-rolling), cold-rolled at room temperature (80% cold-rolling), and heat-treated (recrystallization) at 900° C. for 5 minutes to prepare Sample 1. Sample 1 was additionally oxidized at a temperature of 800° C. for 100 hours to prepare Sample 3.

Comparative Example 1

A ferritic stainless steel base material having a composition of Fe-23Cr-0.02Al-0.4Mn-0.05Ti-0.01C-0.007N-0.1La was prepared.

4567.87 g of Fe, 1350.80 g of Cr, 1.12 g of Al, 24.77 g of Mn, 4.38 g of Ti, 0.6 g of C, 64.52 g of Fe-7.75N-60Cr alloy, and 5.85 g of La were mixed to prepare a metal mixture with a total mass of 6 kg. The mixture was vacuum induction melted using ULVAC FMI-1-158 vacuum induction melting furnace, homogenized at 1150° C. for 24 hours by heat-treatment, and forged at 1150° C. to a thickness of 37 mm. Subsequently, the ferritic stainless steel base material was hot-rolled at 1050° C. (50% hot-rolling), cold-rolled at room temperature (80% cold-rolling), and heat-treated (recrystallization) at 900° C. for 5 minutes to prepare Sample 2. Sample 2 was additionally oxidized at a temperature of 800° C. for 100 hours to prepare Sample 4.

Evaluation Example

Scanning electron microscope (SEM) images of surfaces of Sample 3 and Sample 4 obtained by respectively oxidizing Sample 1 of Example 1 and Sample 2 of Comparative Example 1 at a temperature of 800° C. for 100 hours are shown in FIG. 1. Referring to FIG. 1, Cu in an oxide layer present on the surface of Sample 3 was observed in the corresponding SEM image (left-side image). The observed Cu indicated Cu-containing spinel oxide. The Cu-containing spinel oxide were observed on many parts of the surface of Sample 3. However, an oxide layer present on the surface of Sample 4 shown in the corresponding SEM image (right-side image) was observed while Cu-containing spinel oxide were not observed. The particles present on the surface of Sample 4 were a Mn-based oxide or a Cr-based oxide represented by $(Mn, Cr)_3O_4$.

Figure 2:
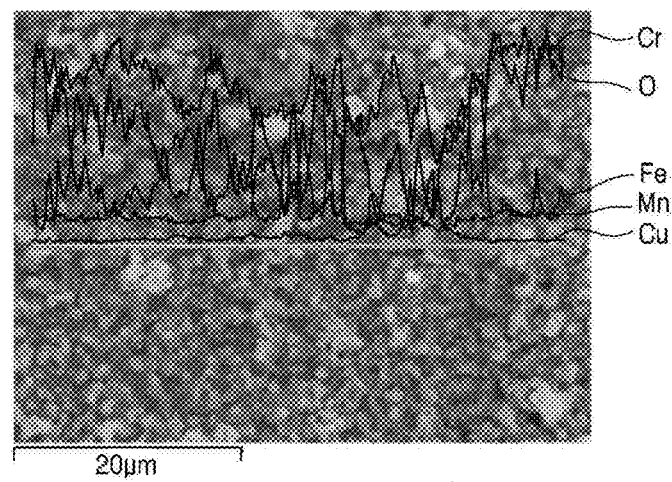
FIG. 2 is a graph showing a content change of each element measured using energy dispersive spectroscopy (EDS) by line scanning.
Figure 2:
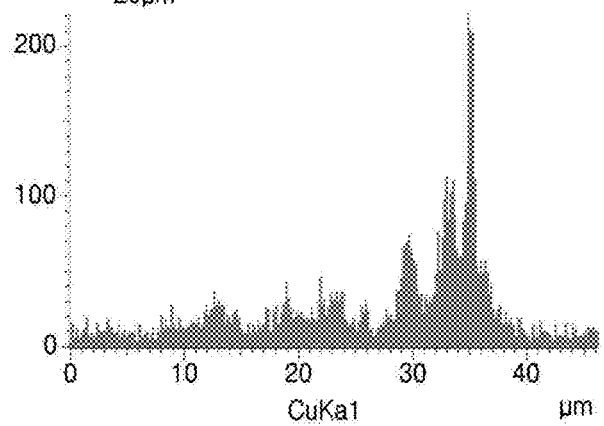

Compositions of the oxide layer were analyzed using energy dispersive spectroscopy (EDS) by moving an electron beam along a base straight pink line inside the SEM image for the surface of Sample 3, which was obtained by oxidizing Sample 1 of Example 1 at a temperature of 800° C. for 100 hours. The result is shown in FIG. 2. Referring to FIG. 2, the composition change of Cu is magnified and shown as a spectrum. As an amount of Cu seems significantly increased at a particular oxide particle, it may be confirmed that an oxide containing an abundant amount of Cu is formed on the surface of Sample 3.

Figure 3A:
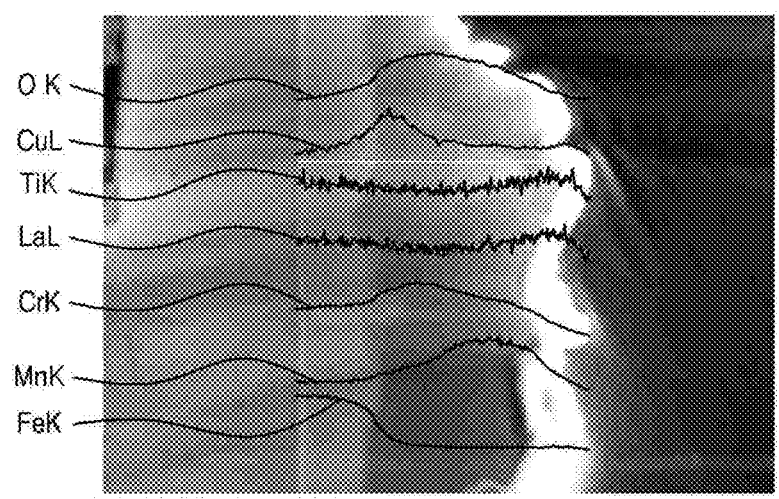
FIG. 3A is an image and a graph illustrating the EDS line scanning analysis results of one region of the oxidation-resistant ferritic stainless steel of Example 1.
Figure 3B:
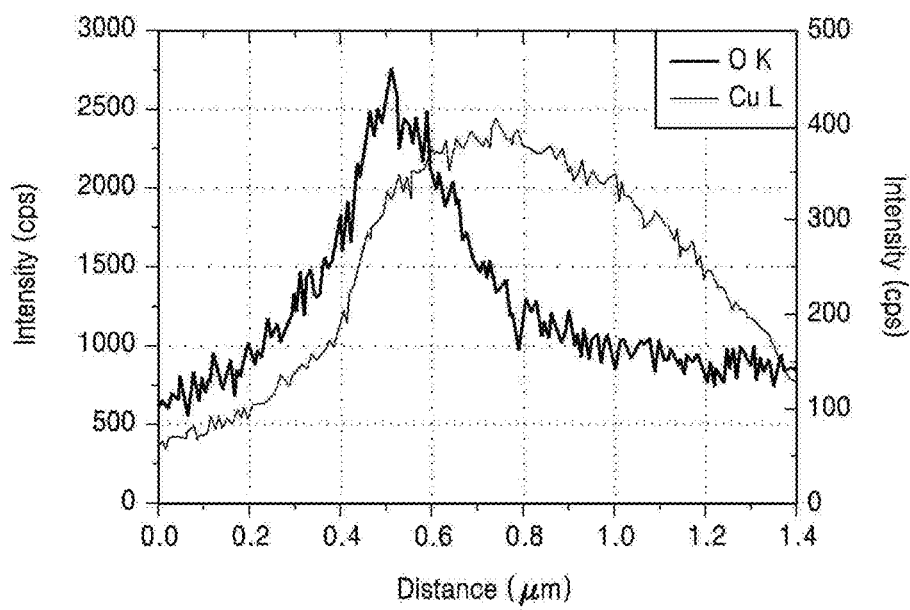
FIG. 3B is a graph that only shows intensities of oxygen and copper depending on positions based on the EDS line scanning analysis results of FIG. 3A.

One region of Sample 3 obtained by oxidizing Sample 1 of Example 1 at a temperature of 800° C. for 100 hours was cut, and the region was analyzed by cross-sectional EDS line scanning. The result is shown in FIG. 3A. A direction from left to right of FIG. 3A is a direction of the base material layer to the oxide surface layer. FIG. 3B is a graph that only shows intensities of oxygen and copper depending on positions. As shown in FIG. 3B, a large amount of Cu is distributed in the oxide layer. Also, it may be confirmed that $CuCr_2O_4$ is formed as the intensities of Cu and Cr show the same trend in FIG. 3B.

Figure 4A:
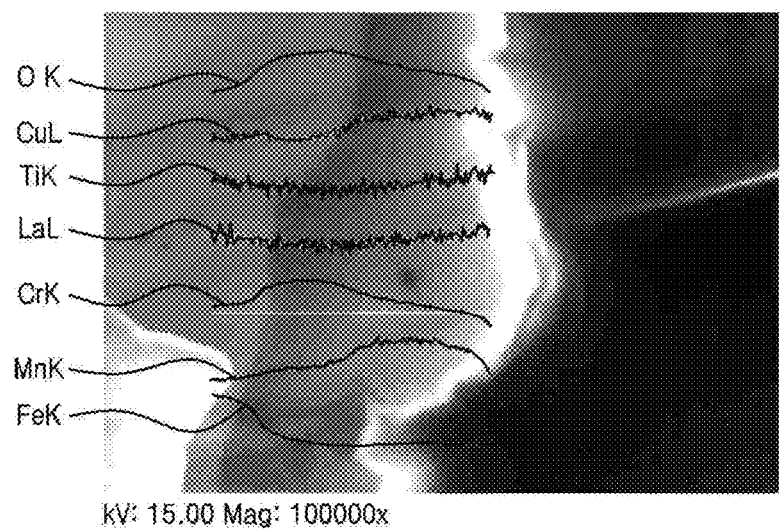
FIG. 4A is an image and a graph illustrating the EDS line scanning analysis results of another region of the oxidation-resistant ferritic stainless steel of Example 1.
Figure 4B:
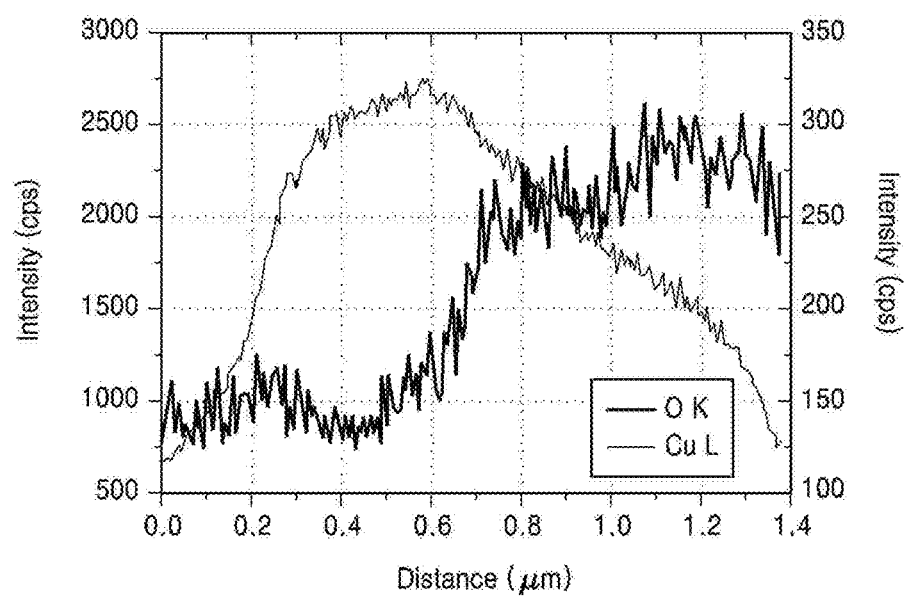
FIG. 4B is a graph that only shows intensities of oxygen and copper depending on positions based on the EDS line scanning analysis results of FIG. 4A.

Another region of Sample 3 obtained by oxidizing Sample 1 of Example 1 at a temperature of 800° C. for 100 hours was cut, and the region was analyzed by cross-sectional EDS line scanning. The result is shown in FIG. 4A. A direction from left to right of FIG. 4A is a direction of the base material layer to the oxide surface layer. FIG. 4B is a graph that only shows intensities of oxygen and copper depending on positions. As shown in FIG. 4B, a large amount of Cu is distributed in a surface portion of the oxide layer. Also, it may be confirmed that $(Cu,Mn)_3O_4$ is formed as intensities of Cu and Mn show the same trend in FIG. 4B.

Figure 5:
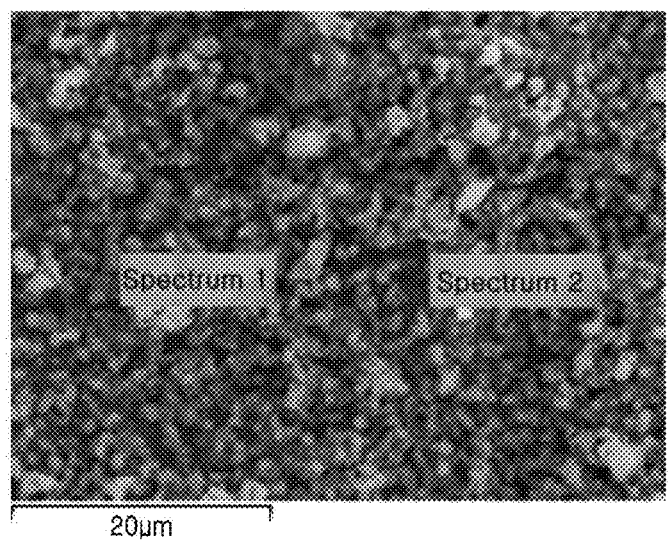
FIG. 5 is an image illustrating spectrum regions 1 and 2 selected for analysis of composition of a Cu-containing spinel oxide present on the surface of the oxidation-resistant ferritic stainless steel of Example 1.
Figure 6:
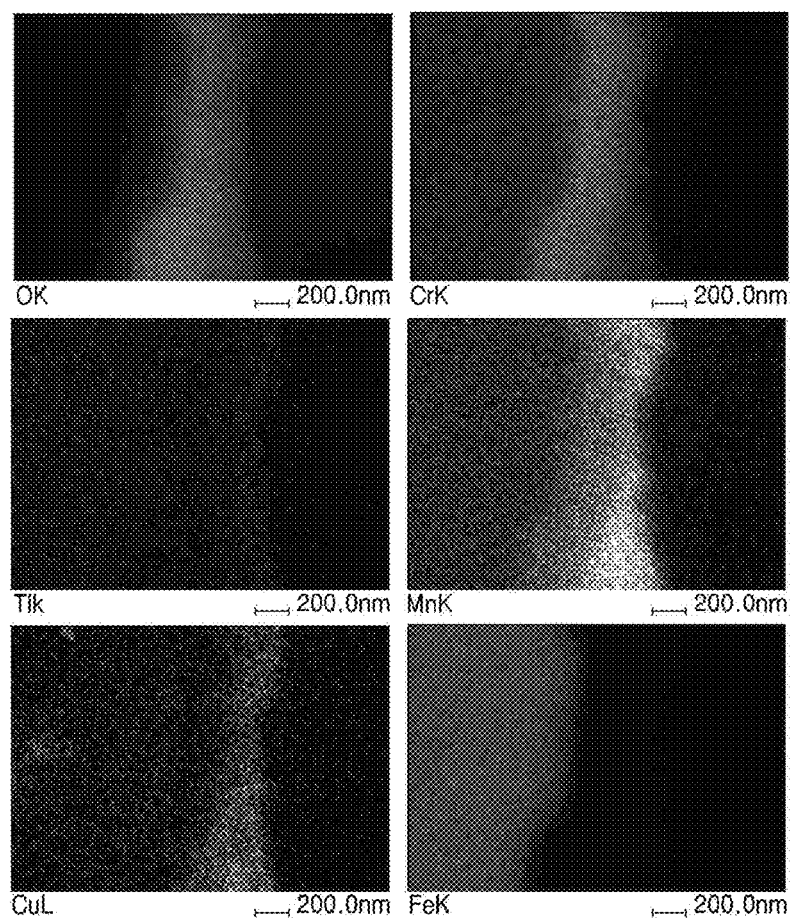
FIG. 6 shows images illustrating the EDS mapping analysis results of a cross sectional region of the oxidation-resistant ferritic stainless steel of Example 1.

The compositions of the oxide were analyzed by calculating atom % of the Cu-containing spinel oxide present on the surface of Sample 3 obtained by oxidizing Sample 1 of Example 1 at a temperature of 800° C. for 100 hours. Referring to FIG. 5, the atom % of a region where the Cu-containing spinel-structured oxide is present on the surface of Sample 3 was calculated. At a spectrum region 1, 42.19 of O, 55.58 of Cr, 1.19 of Mn, and 1.04 of Cu based on 100 total weight of the oxide were calculated. At a spectrum region 2, 27.71 of O, 45.49 of Cr, 0.86 of Mn, and 25.94 of Cu based on 100 total weight of the oxide were calculated. If the values are converted to atom %, the spectrum region 1 has 70.43 of O, 28.55 of Cr, 0.58 of Mn, and 0.44 of Cu, and the spectrum region 2 has 57.15 of O, 28.86 of Cr, 0.52 of Mn, and 13.47 of Cu. That is, an oxide including an abundant amount of Cr was formed at the spectrum region 1, and $CuCr_2O_4$ including Cu was formed at the spectrum region 2. Another region of Sample 3 obtained by oxidizing Sample 1 of Example 1 at a temperature of 800° C. for 100 hours was cut, and the region was analyzed by cross-sectional EDSmapping. The result is shown in FIG. 6. As shown in FIG. 6, the oxide layer is composed of a mixture of Cr, Mn, Cu, etc., and it may be confirmed that $(Cu,Mn)3O4$ is formed as the distribution of Cu almost matches with the distribution of Mn on the region.

Figure 7:
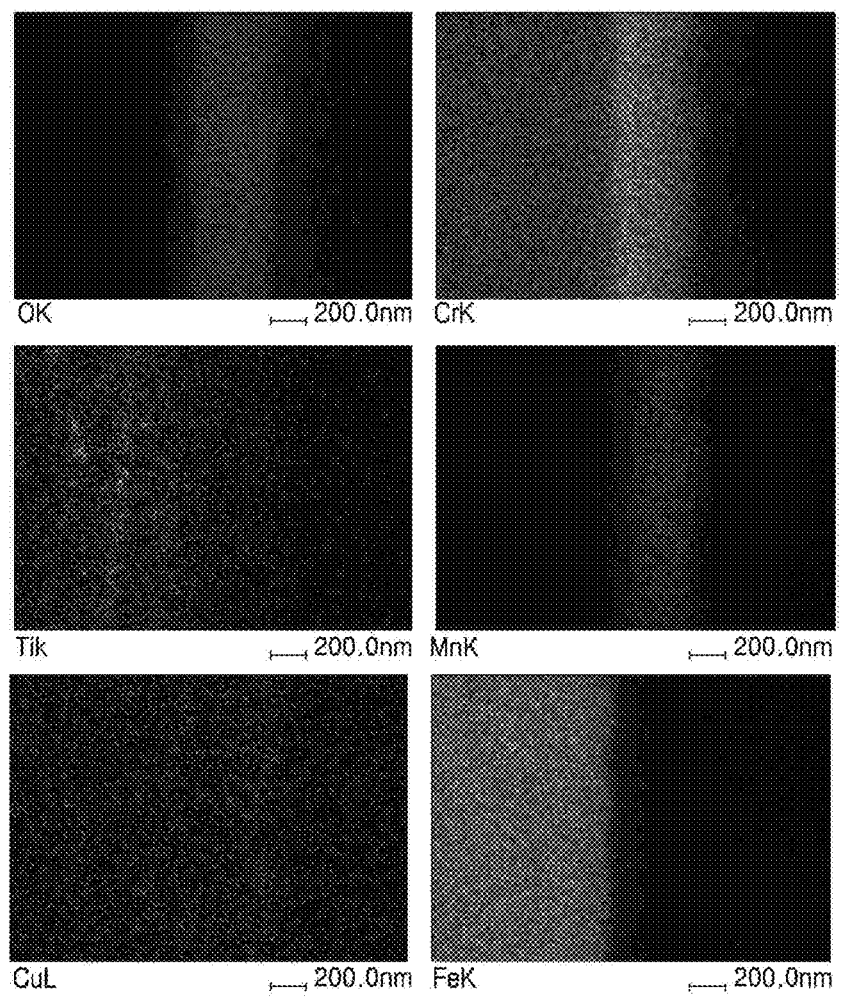
FIG. 7 shows images illustrating the EDS mapping analysis results of a cross sectional region of the oxidation-resistant ferritic stainless steel of Comparative Example 1.

One region of Sample 4 obtained by oxidizing Sample 2 of Comparative Example 1 at a temperature of 800° C. for 100 hours was cut, and the region was analyzed by cross-sectional EDSmapping. The result is shown in FIG. 7. As shown in FIG. 7, Cu was not observed in the oxide layer at all, and it may be confirmed that a mixture of Cr, Mn, etc. was formed in the oxide layer.

Figure 8A:
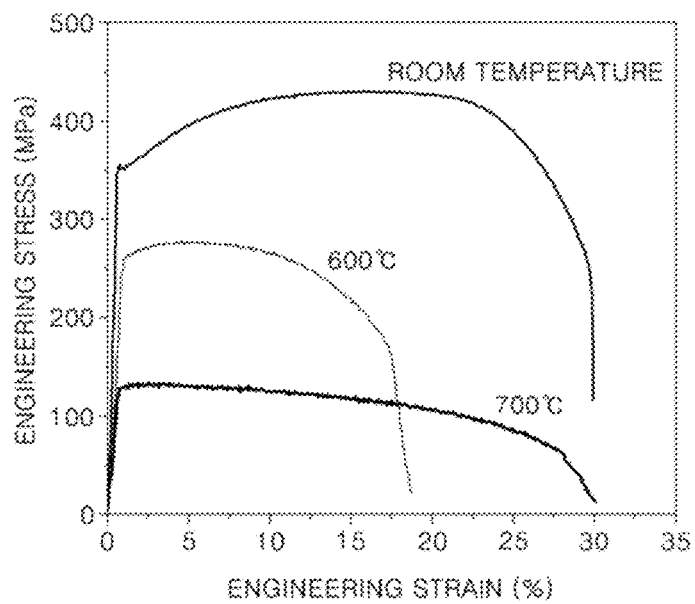
FIG. 8A is a graph illustrating measurement of tensile strengths of the oxidation-resistant ferritic stainless steel of Example 1.
Figure 8B:
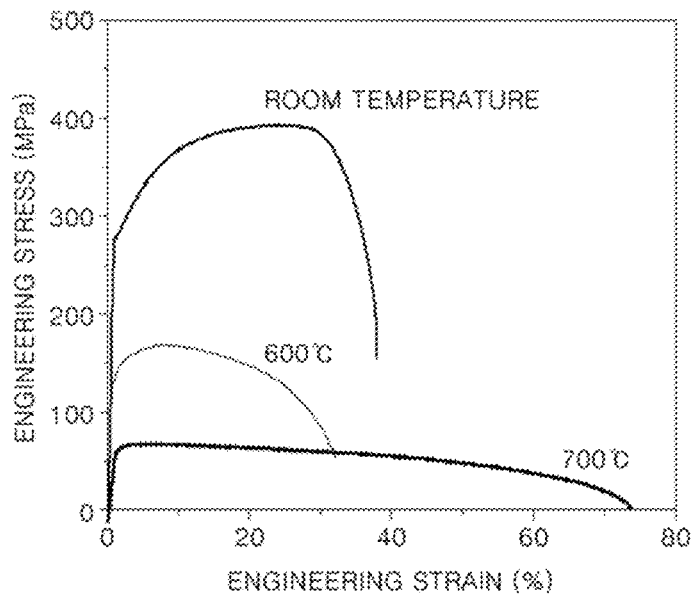
FIG. 8B is a graph illustrating measurement of tensile strengths of the ferritic stainless steel of Comparative Example 1.

Tensile strengths were measured using an Instron machine in order to evaluate the tensile strengths of Sample 1 of Example 1 and Sample 2 of Comparative Example 1. The results are shown in FIG. 8. Referring to FIG. 8, a yield strength was about 350 MPa, and a ultimate tensile strength exceeded 400 MPa at room temperature in a case of Sample 1, and such strengths decreased at relatively higher temperatures of 600° C. and 700° C. (FIG. 8A). Meanwhile, a yield strength was lower than 300 MPa, and a ultimate tensile strength was lower than 400 MPa at room temperature in a case of Sample 2 (FIG. 8B). That is, if Samples 1 and 2 were compared at the same temperature, it may be confirmed that strength of Sample 1 was higher than that of Sample 2. Particularly, a strength of Sample 1 was about 10% higher than that of Sample 2 at room temperature, a strength of Sample 1 was about 64% higher than that of Sample 2 at 600° C., and a strength of Sample 1 was about 93% higher than that of Sample 2 at 700° C. Therefore, it may be confirmed that the tensile strength of Sample 1 was significantly increased compared to that of Sample 2.

Figure 9A:
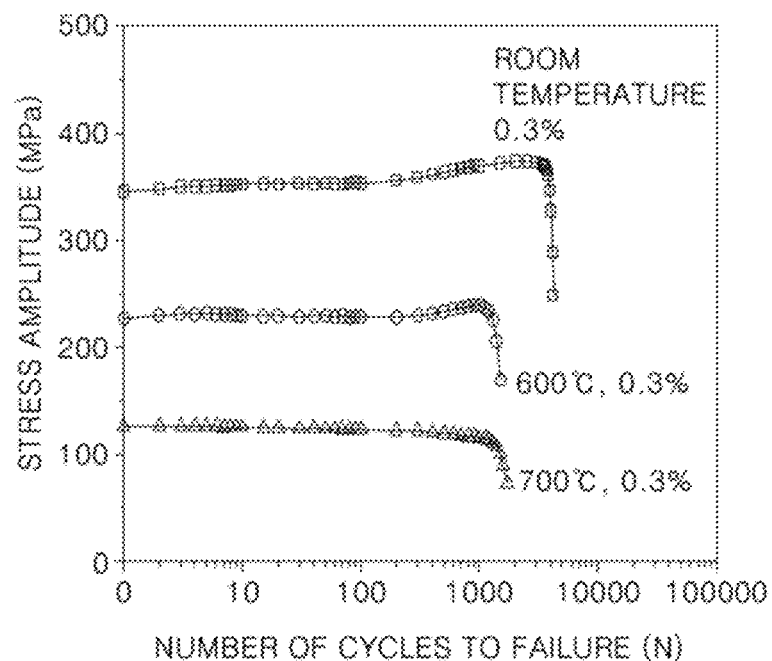
FIG. 9A is a graph illustrating measurement of low cycle fatigue strengths of the oxidation-resistant ferritic stainless steel of Example 1.
Figure 9B:
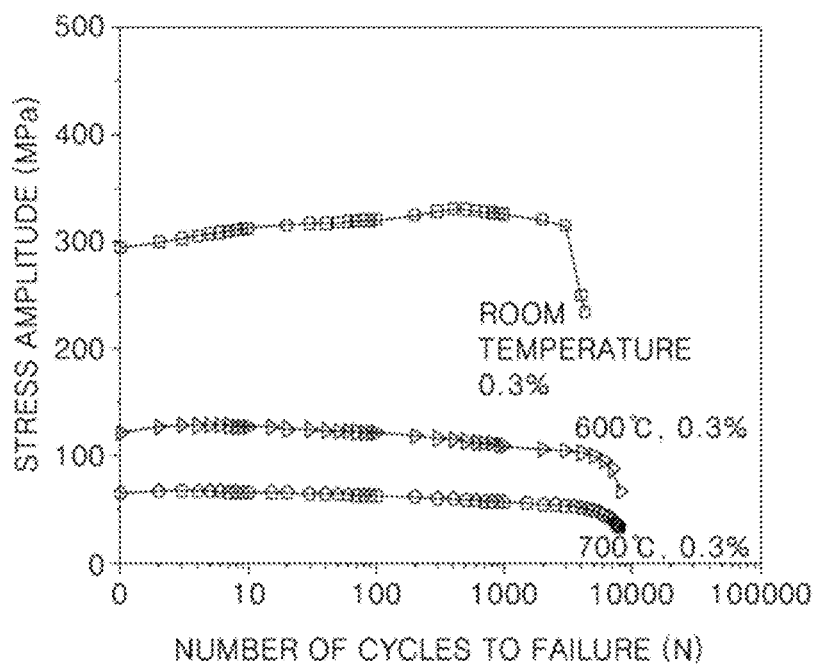
FIG. 9B is a graph illustrating measurement of low cycle fatigue strengths of the ferritic stainless steel of Comparative Example 1.

A fatigue fracture test was performed using a low cycle fatigue method in order to evaluate fatigue strengths of Sample 1 of Example 1 and Sample 2 of Comparative example 1. The results are shown in FIG. 9. Referring to FIG. 9, a maximum fatigue strength in the case of Sample 1 was is about 350 MPa at room temperature, about 230 MPa at 600° C., and about 130 MPa at 700° C. (FIG. 9A). Meanwhile, a maximum fatigue strength in the case of Sample 2 was about 320 MPa at room temperature, about 120 MPa at 600° C., and about 80 MPa at 700° C. (FIG. 9B). That is, the fatigue strength of Sample 1 was increased about 13% at room temperature, about 87% at 600° C., and about 90% at 700° C. compared to those of Sample 2. Therefore, it may be confirmed that the fatigue strength of Sample 1 was significantly increased compared to that of Sample 2.

Figure 10:
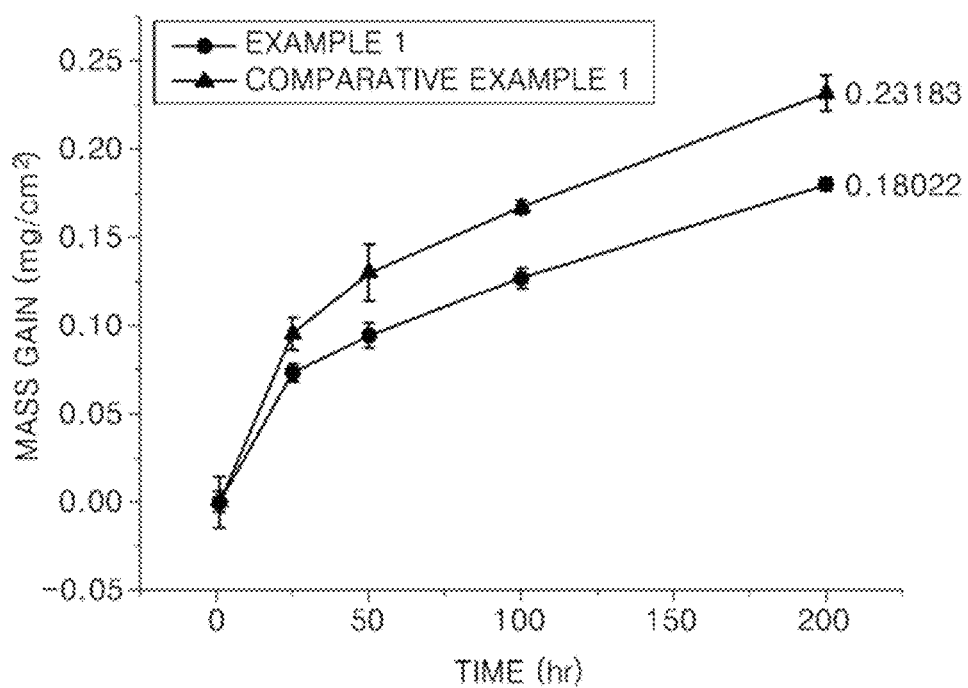
FIG. 10 is a graph illustrating measurement of oxidation resistances of the oxidation-resistant ferritic stainless steel of Example 1 and the ferritic stainless steel of Comparative Example 1.

Mass gains were measured according to time for 200 hours at 800° C. in order to evaluate oxidation resistances of Sample 1 of Example 1 and Sample 2 of Comparative Example 1. The results are shown in FIG. 10. Referring to FIG. 10, the mass gain of Sample 1 after 200 hours was measured to be 0.18022 mg/cm$^2$, and the mass gain of Sample 2 after 200 hours was measured to be 0.23183 mg/cm$^2$. Therefore, it is confirmed that the oxidation resistance of Sample 1 was about 22% increased compared to that of Sample 2.

Figure 11A:
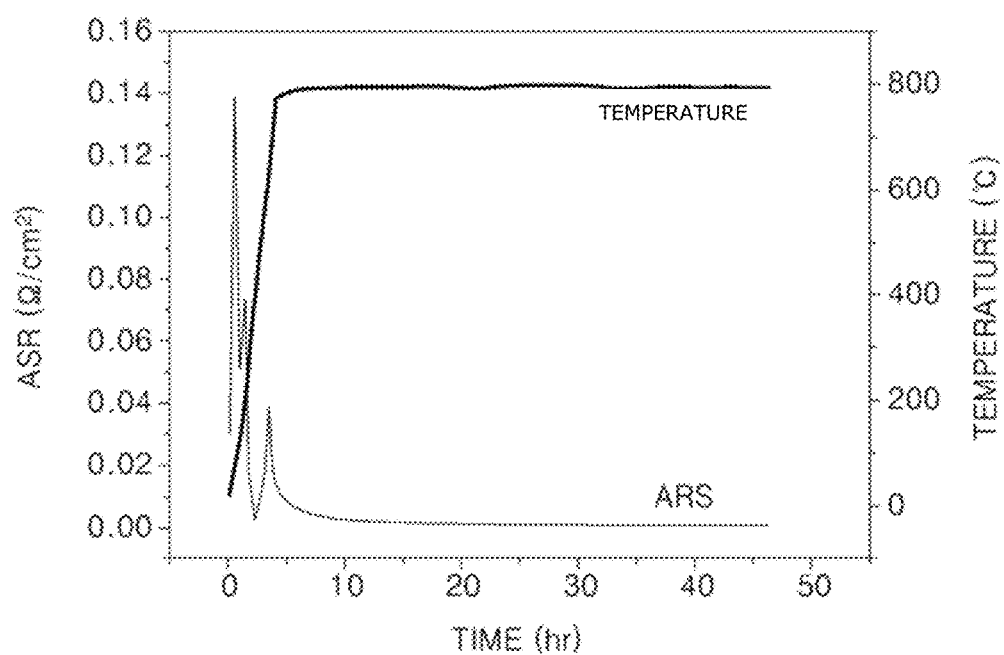
FIG. 11A is a graph illustrating measurement of electrical conductivities of the oxidation-resistant ferritic stainless steel of Example 1.
Figure 11B:
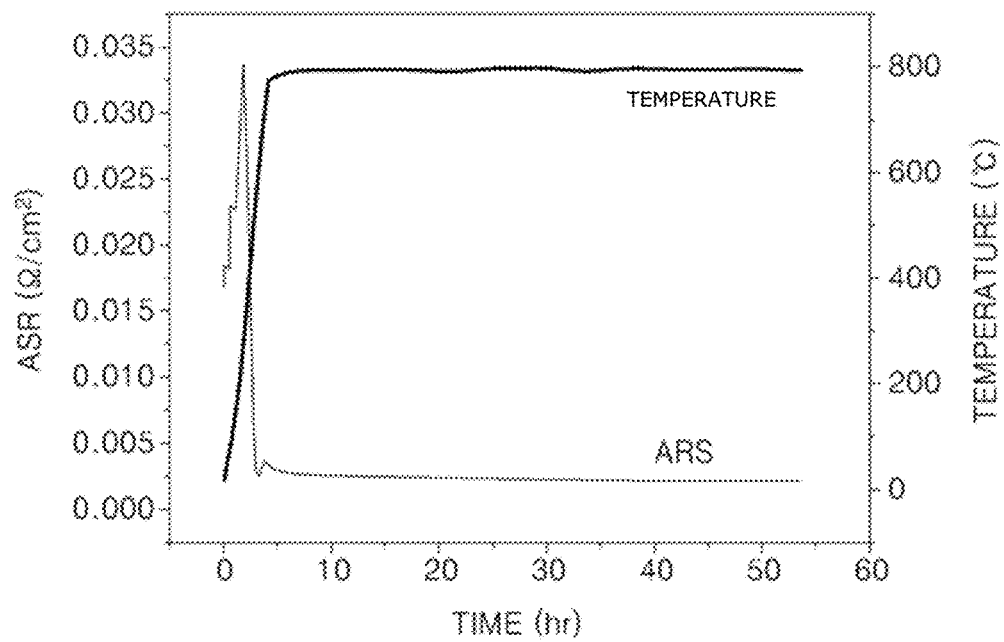
FIG. 11B is a graph illustrating measurement of electrical conductivities of the ferritic stainless steel of Comparative Example 1.

Area specific resistances (ASRs) were measured in order to evaluate electrical conductivities of Sample 1 of Example 1 and Sample 2 of Comparative Example 1. The results are shown in FIG. 11. Referring to FIG. 11, the ASR of Sample 1 was 0.0017 Ω/cm$^2$ at 800° C. (FIG. 11A), and the ASR of Sample 2 was 0.0022 Ω/cm$^2$ at 800° C. (FIG. 11B). An ASR is inversely proportional to an electrical conductivity, and thus a lower ARS indicates a higher electrical conductivity. Therefore, it is confirmed that the electrical conductivity of Sample 1 was about 30% increased compared to that of Sample 2.

Figure 12:
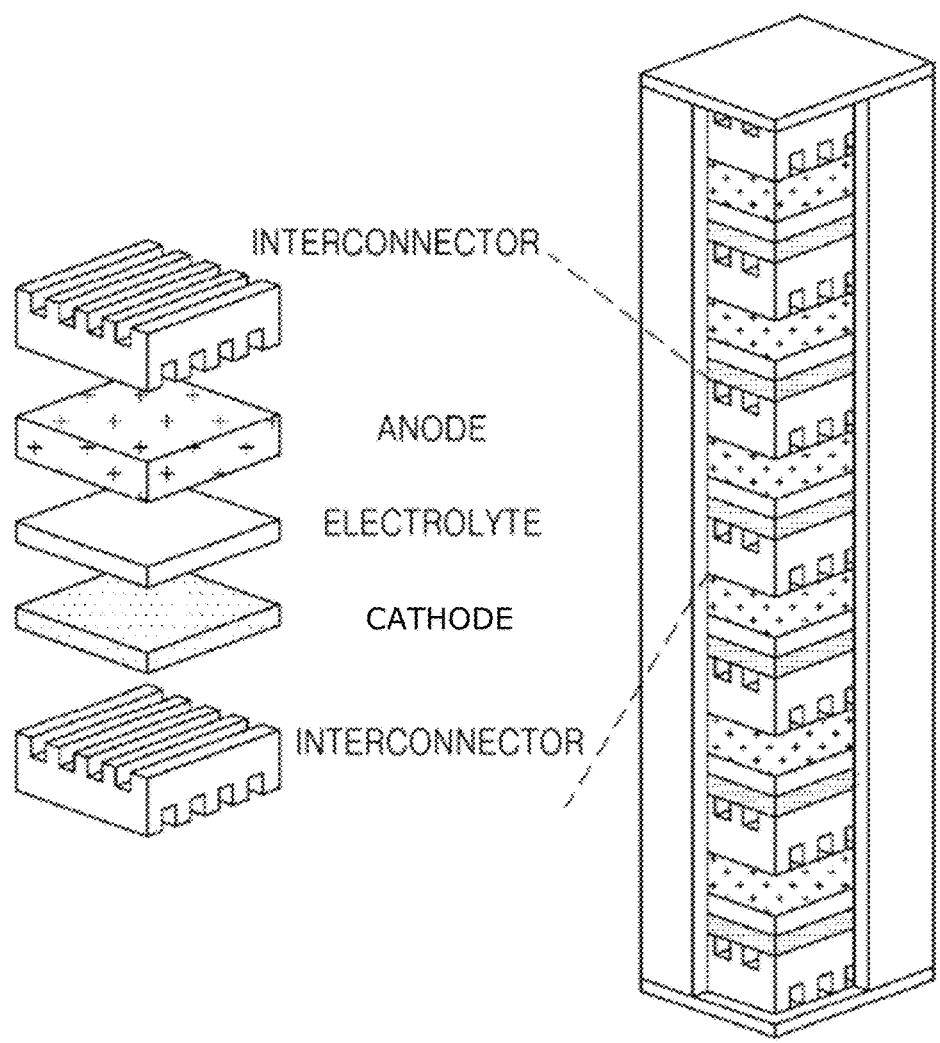
FIG. 12 is a drawing illustrating a fuel cell according to an embodiment of the present invention.

A fuel cell according to an embodiment of the present invention includes unit cells each including an anode, an electrolyte and a cathode, and the fuel cell interconnector described above connecting the unit cells. Referring to FIG. 12, the fuel cell includes stacks of unit cells each including an anode, an electrolyte, and a cathode, and the interconnector connects the several unit cells at two ends of each of the unit cells. As described above, the interconnector includes the ferritic stainless steel base material including Fe, Cr, Mn, and Cu, and the oxidation-resistant ferritic stainless steel including the spinel-structured oxide formed on the base material, where in the spinel-structured oxide contains Cu and at least one of Mn and Cr.

Figure 13:
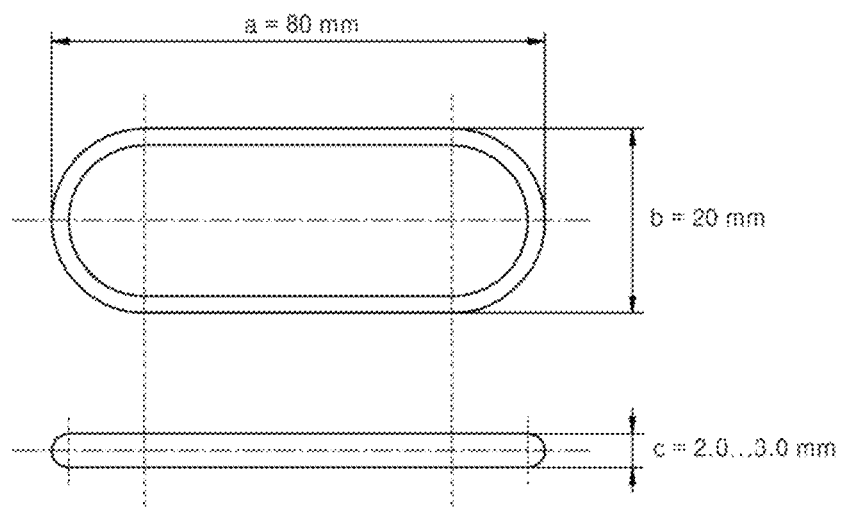
FIG. 13 is a diagram illustrating a sample shape to test Cr volatility of the oxidation-resistant ferritic stainless steel according to an embodiment of the present invention.

Meanwhile, in order to test Cr volatility suppressing effect of the oxidation-resistant ferritic stainless steel according to an embodiment of the present invention, the samples obtained in Example 1 and Comparative Example 1 were each prepared to have the same size and shape with a drawing shown in FIG. 13 of a fuel cell interconnector having a length a=80 mm, having a width b=20 mm, and having a height c of from about 2.0 mm to about 3.0 mm.

The prepared samples were heated at a temperature of 800° C., air containing moisture that is 60% of an amount of saturated water vapor at room temperature was flowed to the heated samples, and the volatized Cr was captured using Rasching ring, which is a porous ceramic, for 100 hours. The captured Cr was dissolved in hydrochloric acid, and the solution was quantitatively analyzed by using an inductively coupled plasma (ICP) technique (Simultaneous ICP OES Spectrometer, Varian VISTA 720-ES).

Figure 14:
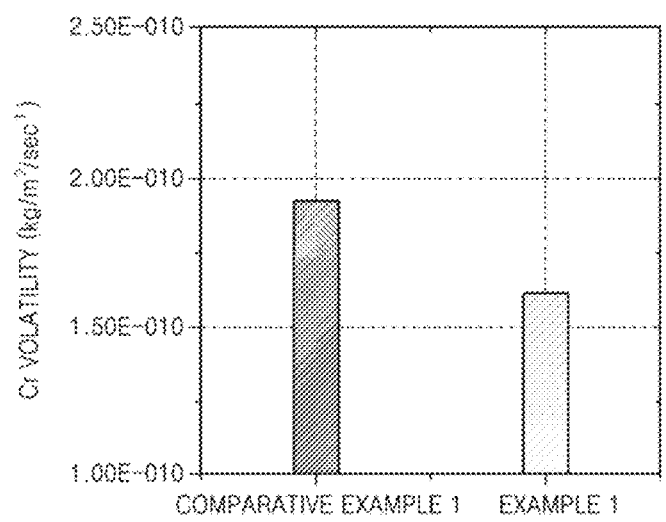
FIG. 14 is a graph illustrating Cr evaporation rates of the ferritic stainless steels of Example 1 and Comparative Example 1 according to an embodiment of the present invention.

The test was performed for 5 times, and an average result is shown in FIG. 14. As shown in FIG. 14, Cr volatility of the ferritic stainless steel of Example 1 reduced in 16% compared to Comparative Example 1, which does not contain a Cu oxide.

As described above, when the oxidation-resistant ferritic stainless steel according to one or more of the above embodiments of the present invention is used as a fuel cell interconnector, a room temperature strength, a high temperature strength, and a high temperature fatigue strength are increased, and thus the oxidation-resistant ferritic stainless steel may be used for a longer time at a relatively high temperature. Also, the oxidation-resistant ferritic stainless steel according to one or more of the above embodiments of the present invention has an excellent oxidation resistance and improved electrical conductivity, and reduced Cr volatility. Thus when the oxidation-resistant ferritic stainless steel is used as an interconnector for a fuel cell, performance of the fuel cell is excellent.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An oxidation-resistant ferritic stainless steel comprising:
   a ferritic stainless steel base material comprising Fe, Cr, Mn, and Cu and
   a spinel-structured oxide containing an oxide represented by $(Cu, Mn)_3O_4$;
   wherein the ferritic stainless steel base material comprises about 10 to about 30 wt % of Cr about 0.4 to about 2.0 wt % of Mn, about 1.5 to about 7.5 wt % of Cu, and the rest of Fe, and
   wherein the spinel-structured oxide containing Cu and Mn is formed from Cu and Mn in the ferritic stainless steel base material.

2. The oxidation-resistant ferritic stainless steel of claim 1, wherein the spinel-structured oxide comprises an oxide represented by $Cu_{1.3}Mn_{1.7}O_4$.

3. An oxidation-resistant ferritic stainless steel comprising:

a ferritic stainless steel base material comprising Fe, Cr, Mn, Cu, Al, Ti, C, La and N and a spinel-structured oxide containing Cu and Mn;

wherein the ferritic stainless steel base material comprises about 10 to about 30 wt % of Cr, about 0.3 wt % or less of Al, about 0.1 to about 2.0 wt % of Mn, about 0.02 to about 0.5 wt % of Ti, about 0.2 wt % or less of C, about 0.1 wt % or less of N, about 0.01 to about 0.5 wt % of La, about 1.5 to about 7.5 wt % of Cu, and the rest of Fe, and wherein the spinel-structured oxide containing Cu and Mn is formed from Cu and Mn in the ferritic stainless steel base material.

4. The oxidation resistant ferritic stainless steel of claim 3, wherein the amount of Cu contained in the ferritic stainless steel base material is about 1.5 wt % to about 3.4 wt %.

5. The oxidation-resistant ferritic stainless steel of claim 3, wherein the spinel-structured oxide comprises an oxide represented by $(Cu, Mn)_3O_4$.

6. The oxidation-resistant ferritic stainless steel of claim 5, wherein the spinel-structured oxide comprises an oxide represented by $Cu_{1.3}Mn_{1.7}O_4$.

7. A method of manufacturing an oxidation-resistance ferritic stainless steel, the method comprising:

providing a ferritic stainless steel base material comprising Fe, Cr, Mn, Cu, Al, Ti, C, La and N wherein the ferritic stainless steel base material comprises about 10 to about 30 wt % of Cr, about 0.3 wt % or less of Al about 0.1 to about 2.0 wt % of Mn, about 0.02 to about 0.5 wt % of Ti, about 0.2 wt % or less of C, about 0.1 wt % or less of N, about 0.01 to about 0.5 wt % of La, about 1.5 to about 7.5 wt % of Cu, and the rest of Fe, and forming a spinel-structured oxide that comprises Cu and Mn in the ferritic stainless steel base material by heat treatment of the base material at a temperature in a range of about 600° C. to about 800° C. wherein the spinel-structured oxide containing Cu and Mn is formed from Cu and Mn the ferritic stainless steel base material.

8. The method of claim 7, wherein the amount of Cu contained in the ferritic stainless steel base material is about 1.5 wt % to about 3.4 wt %.

9. The method of claim g, wherein the heat treatment is performed for about 10 minutes to about 500 hours.

10. A fuel cell interconnector comprising the oxidation-resistant ferritic stainless steel of claim 3.

11. A fuel cell comprising:

unit cells each comprising an anode, an electrolyte and a cathode; and the fuel cell interconnector of claim 10 connecting the unit cells.

* * * * *